United States Patent [19]

Yasuda et al.

[11] 4,428,884

[45] Jan. 31, 1984

[54] NOVEL α-SUBSTITUTED CARBOXYLAMIDOAMINE AND PROCESS FOR PRODUCING THE SAME

[75] Inventors: Yutaka Yasuda, Wakayama; Kiyoshi Tsuchihashi, Kainan; Toshiro Nishimura, Wakayama, all of Japan

[73] Assignee: Kao Soap Co., Ltd., Tokyo, Japan

[21] Appl. No.: 317,224

[22] Filed: Nov. 2, 1981

[30] Foreign Application Priority Data

Nov. 10, 1980 [JP] Japan ............................... 55-157837

[51] Int. Cl.³ ........................... C09F 5/00; C09F 7/00; C11C 3/00

[52] U.S. Cl. ................................................ 260/404.5

[58] Field of Search ................................ 260/404.5 R

[56] References Cited

U.S. PATENT DOCUMENTS

| | | | |
|---|---|---|---|
| 3,941,817 | 3/1976 | Chakrabarti | 260/404.5 R |
| 4,044,034 | 8/1977 | Christiansen | 260/404.5 R |
| 4,121,009 | 10/1978 | Chakrabarti | 260/404.5 R |
| 4,137,245 | 1/1979 | Christiansen | 260/404.5 R |
| 4,180,468 | 12/1979 | Tomidokoro et al. | 260/404.5 R |
| 4,303,588 | 12/1981 | Okabe et al. | 260/404.5 R |
| 4,304,932 | 12/1981 | Phillips et al. | 260/404.5 R |

*Primary Examiner*—Helen M. S. Sneed

*Attorney, Agent, or Firm*—Flynn, Thiel, Boutell & Tanis

[57] ABSTRACT

An α-substituted carboxylamidoamine represented by the general formula I:

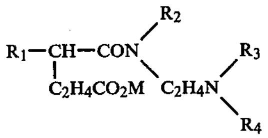

(I)

wherein $R_1$ represents a $C_6$-$C_{20}$ alkyl or alkenyl group, $R_2$ represents H or $C_2H_4OH$, $R_3$ and $R_4$ represent each H, $C_2H_4CO_2M$ or $C_2H_4OH$ and when $R_2$ is $C_2H_4OH$, $R_3$ and $R_4$ represent each H or $C_2H_4CO_2M$ and when $R_2$ is H, one of $R_3$ and $R_4$ represents $C_2H_4OH$, and M is H, an alkali metal, an ammonium or an organic ammonium is novel and useful as a surfactant.

8 Claims, No Drawings

NOVEL α-SUBSTITUTED CARBOXYLAMIDOAMINE AND PROCESS FOR PRODUCING THE SAME

This invention relates to a novel α-substituted carboxylamidoamine having a carboxyethyl group in an α position of the amido group, represented by the general formula I:

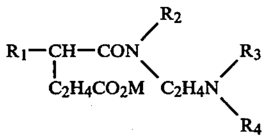
(I)

wherein $R_1$ represents a $C_6$–$C_{20}$ alkyl or alkenyl group, $R_2$ represents H or $C_2H_4OH$, $R_3$ and $R_4$ represent each H, $C_2H_4CO_2M$ or $C_2H_4OH$ and when $R_2$ is $C_2H_4OH$, $R_3$ and $R_4$ represent H or $C_2H_4CO_2M$ and when $R_2$ is H, one of $R_3$ and $R_4$ represents $C_2H_4OH$, and M represents H, an alkali metal, an ammonium or an organic ammonium, and also relates to a process for producing the same.

An amidoamine type compound obtained from an imidazoline and an alkyl acrylate is an amphoteric surfactant having mild properties, and has been used widely in many applications.

Processes for producing such a compound are disclosed, for example, in Jap. Pat. Laid-open Nos. 65,141/1977 and 68,721/1978. The process described in Jap. Pat. Laid-open No. 65,141/1977 is a process which comprises: reacting an imidazoline obtained from a fatty acid and aminoethylethanolamine with water thereby obtaining a corresponding amidoamine, and then reacting the amidoamine with an alkyl acrylate thereby producing an amidoamine type compound represented by the general formula II, III or IV:

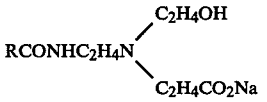
(II)

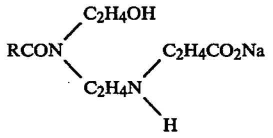
(III)

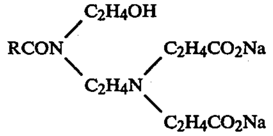
(IV)

wherein R represents an alkyl or an alkenyl.

The process described in Jap. Pat. Laid-open No. 68,721/1978 is a process which comprises: reacting an imidazoline derivative with an alkyl acrylate and water, and in this process an amidoamine type compound of a structure represented by the above general formula IV is obtained.

These conventional amidoamine type compounds represented by the general formulas II–IV are prepared by reacting an alkyl acrylate with an amidoamine formed by the reaction of an imidazoline and water. Such amidoamine type compounds, however, have a drawback that they discolor markedly when stored at high temperatures.

As a result of study to obtain an amidoamine type compound free from such a drawback, the inventors have found an amidoamine type compound having a novel structure and have achieved this invention.

As examples of a compound of this invention, represented by the general formula I, there can be mentioned N-[α-(2-carboxyethyl)-lauroyl]-N′-(2-hydroxyethyl)-N′-(2-carboxyethyl) ethylenediamine; N-[α-(2-carboxyethyl)-lauroyl]-N-(2-hydroxyethyl)-N′-(2-carboxyethyl) ethylenediamine; N-[α-(2-carboxyethyl)-lauroyl]-N-(2-hydroxyethyl)-N′-[di-(2-carboxyethyl)] ethylenediamine; N-[α-(2-carboxyethyl)-stearoyl]-N′-(2-hydroxyethyl)-N′-(2-carboxyethyl) ethylenediamine; N-[α-(2-carboxyethyl)-oleoyl)]-N-(2-hydroxyethyl)-N′-(2-carboxyethyl) ethylenediamine; N-[α-(2-carboxyethyl)-cocooyl]-N-(2-hydroxyethyl)-N′-[di-(2-carboxyethyl)] ethylenediamine.

The compound of this invention, represented by aforementioned general formula I can be produced by the following process: a process which comprises: reacting 1 mol of an imidazoline represented by the general formula I-1:

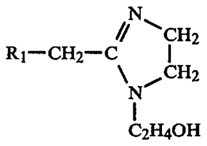
(I-1)

wherein $R_1$ is the same as in the general formula I, with 1.0–5.0 mol of an alkyl acrylate at a reaction temperature of 40°–90° C. in a substantially anhydrous condition, thereby obtaining an intermediate represented by the general formula I-2:

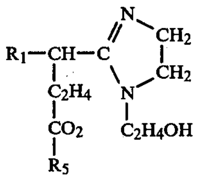
(I-2)

wherein $R_1$ has the same meaning as in the general formula I, and $R_5$ represents a $C_1$–$C_4$ alkyl; adding to this intermediate, 1.0–5.0 mol of water and optionally an alkyl acrylate in portions, in a total amount not exceeding 5.0 mol; reacting the resulting mixture at a reaction temperature of 40°–90° C.; and saponifying the reaction product with an aqueous alkali solution.

This process is described in further detail.

To 1 mol of an imidazoline represented by the general formula I-1 is added 1.0–5.0 mol, preferably, 1.5–3.5 mol of an alkyl acrylate, and the mixture is reacted without addition of water, at a temperature of 40°–90° C., preferably, 50°–80° C. for a time of 0.5–6 hr., preferably, 2–4 hr. in a substantially anhydrous condition, thereby obtaining an intermediate represented by the general formula I-2. Then, to this intermediate is added 1.0–5.0 mol, preferably, 1.5–2.5 mol of water, and the resulting mixture is reacted at a temperature of 40°–90° C., preferably 60°–80° C. for a time of 1–7 hr., preferably, 2–4 hr., thereby opening the imidazoline ring and adding the alkyl acrylate present to the resulting amidoamine.

The alkyl acrylate may be added all at a time at the start or may be added in portions, in such a manner that an amount required to add to an $\alpha$ position of the intermediate or an appropriate amount larger than that is added and then, the remaining portion of the ester together with water is added. The reaction product thus prepared is mixed with an alkali hydroxide usually in an equimolar amount to the alkyl acrylate, and the ester linkages derived from the alkyl acrylate ae saponified at 40°-80° C., usually, 60°-70° C. for 2-3 hr. In this way, the novel amidoamine type compound having a carboxyethyl group in an $\alpha$ position, represented by the above general formula I is obtained.

When the amount of an alkyl acrylate used is smaller than 1 mol per mol of an imidazoline, the yield of an intermediate represented by the general formula I-2 is lowered, an unreacted amine increases and consequently the yield of the compound of this invention, represented by the general formula I is lowered. When the amount of an alkyl acrylate is larger than 5.0 mol per mol of an imidazoline, the content of sodium acrylate in the final product increases. With respect to water used in the reaction, in the stage of producing the first intermediate represented by the general formula I-2, water is not added, and the reaction must be conducted in a substantially anhydrous condition. The reaction in a substantially anhydrous condition means reacting without adding water, aside from a minor amount of water contaminated in the starting materials. To describe this more explicitly, a condition in which the reaction system contains below 0.3% of water is preferred. When the content of water is higher, the yield of the compound of this invention is lowered because this condition approaches to those in the aforementioned known processes. After an intermediate of the general formula I-2 has thus been obtained, 1.0-5.0 mol of water, preferably, 1.5-2.5 mol, per mol of the starting imidazoline, is added to effect the opening of the imidazoline ring and the reaction with an alkyl acrylate to produce an amphoteric compound. When the amount of water is smaller 1.0 mol, the opening of the imidazoline ring can not be effected satisfactorily. When the amount of water is larger than 5.0 mol, the ester linkage in an alkyl acrylate is hydrolyzed with consequent reduction in molar ratio of an alkyl acrylate, and an unreacted amine increases, and sodium acrylate also increases.

As the imidazolines of the general formula I-1, used in this invention, there can be mentioned those imidazolines which can be obtained by dehydration-condensation of aminoethylethanolamine with caprylic acid, capric acid, lauric acid, myristic acid, palmitic acid, stearic acid, erucic acid, oleic acid, linoleic acid, coconut oil fatty acid, beef tallow fatty acid or an ester thereof. And as the alkyl acrylate, there can be mentioned methyl acrylate, ethyl acrylate, propyl acrylate and butyl acrylate.

It is further illustrated that the process and product of this invention are essentially different from those described in aforementioned Jap. Pat. Laid-open Nos. 65,141/1977 and 68,721/1978. In the process described in Jap. Pat. Laid-open No. 65,141/1977, an imidazoline is reacted with water to yield a corresponding amidoamine, and this amidoamine is reacted with an alkyl acrylate to produce a compound of the above formula II, III or IV. According to Jap. Pat. Laid-open No. 68,721/1978, an imidazoline is reacted with an alkyl acrylate and water to produce a compound of the above general formula IV. Because the reaction is carried out in the simultaneous presence of an imidazoline, an alkyl acrylate and water, the imidazoline is hydrolyzed with the water into an amidoamine, and this amidoamine in turn, reacts with the alkyl acrylate forming a compound of the above general formula IV.

On the other hand, the process of this invention comprises: reacting an imidazoline with an alkyl acrylate in a substantially anhydrous condition thereby to add the alkyl acrylate to an $\alpha$-methylene group of the 2-alkyl group of the imidazoline thereby to form an intermediate represented by the above general formula I-2; ring-opening this intermediate; and reacting the resulting amidoamine with the alkyl acrylate thereby to produce an amphoteric compound of the above general formula I, having a carboxyethyl group in an $\alpha$-methylene group of the amido group. Therefore, the process of this invention is essentially different from aforementioned known processes.

The fact that as shown in the general formula I, the amphoteric surfactant produced according to this invention has a structure in which acrylic acid or an acrylate salt is added to an $\alpha$-positioned methylene group of the amido group is confirmed by acid-decomposing the final product to hydrolyze the amido linkages, extracting a hydrophobic group-containing component and analyzing the component. This hydrophobic group-containing component had a major portion of a dibasic acid represented by the general formula V:

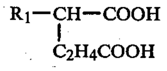

(V)

wherein $R_1$ has the same meaning as in the above general formula I, in addition to a minor proportion of the starting fatty acid: $R_1$—$CH_2COOH$. The structure of the compound represented by the general formula V was identified from GC-MS spectrum of the methyl ester thereof and the fact that the acid value corresponded to that of a dibasic acid.

On the contrary, in case of a compound which does not contain a carboxyethyl group on an $\alpha$-methylene group of the amido group, a hydrophobic group-containing component obtained by acid-decomposition treatment contained only a mono-basic acid: $R_1$—$CH_2$.COOM.

By gas chromatographic analysis on an ethylenediamine derivative which was a hydrophilic group-containing component obtained by cleaving the amido linkage of the above final reaction product, it was confirmed that the compound produced according to this invention contained a compound of the following formula VI, VII or VIII, or a mixture thereof, as well as a small amount of an ether linkage-containing amphoteric compound and a small amount an unreacted amidoamine.

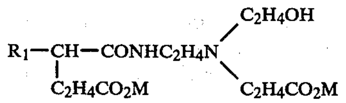

(VI)

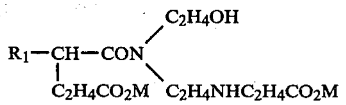

(VII)

-continued (VIII)

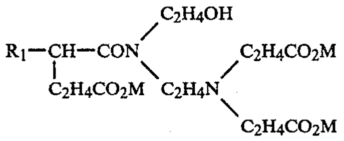

wherein $R_1$ and M are the same as above.

The novel amidoamine type compound having a carboxyethyl group on an α-methylene group of the amido linkage, thus prepared according to this invention is useful as an amphoteric surfactant having a feature that it is mild to the skin, eyes, etc., and that discoloration occuring when it is stored at high temperatures is little as compared with known conventional amidoamine type amphoteric surfactants.

This invention is illustrated in further detail by reference to examples. In these examples, % is % by weight unless otherwise specified.

EXAMPLE 1

Two hundred and sixty-eight g (278 g, 1.0 mol) of 1-(2-hydroxyethyl)-2-undecyl-2-imidazoline was melted at 40°-50° C., to which was added 200 g (2.0 mol) of ethyl acrylate. The mixture was reacted with stirring, at 60°-65° C. for 3 hr. An intermediate of the formula:

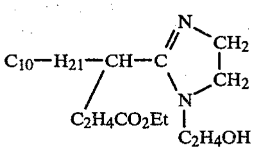

was obtained. The starting imidazoline and ethyl acrylate used in this example had a water content of 0.02% and a water content of 0.10%, respectively. This reaction intermediate was confirmed to have an imidazoline ring from the fact that the intermediate showed a maximum absorption at 232 mμ on UV spectrum measured in ethanol, and showed an absorption due to C=N bond at 1605 $cm^{-1}$. Furthermore, a fatty acid component obtained by decomposition with an alkali or an acid was analyzed for the methyl ester by GC-MS spectrum. The mass spectrum of the principal constituent of the fatty acid component was m/e (relative intensity), 269 (19.7, M-31), 236 (13.1, M-64), 227 (8.2, M-73). Accordingly the structure of this fatty acid methyl ester was confirmed to be

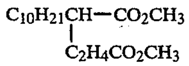

(theoretical molecular weight 300).

As a result of this, the structure of the above reaction intermediate was identified.

Then, to the reaction intermediate was added further 36 g (2.0 mol) of water, and the mixture was stirred at 65°-70° C. for 3 hr. to effect the opening of imidazoline ring and the addition of ethyl acrylate. Further, to this reaction mixture was added an aqueous alkali solution prepared by dissolving 80 g (2.0 mol) of sodium hydroxide into 996 g of water, and the reaction mixture was saponified at 65°-70° C. for 2 hr. As a result, a light yellow liquid was obtained. The reaction product thus produced was subjected to acid decomposition to hydrolyze the amido linkages. The hydrolysis gave a hydrophobic group-containing component and a hydrophilic group-containing component. This hydrophobic group-containing component had an acid value (AV) of 405. From GC-MS spectrum of the methyl ester thereof, the hydrophobic group-containing component was found to contain the following compounds:

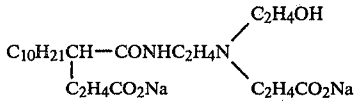 : 63% (IX)

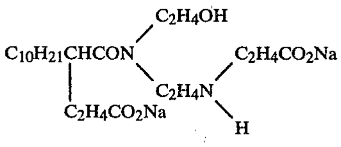 : 18% (X)

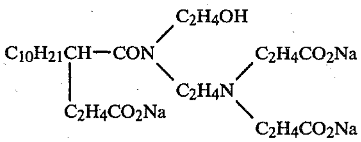 : 8% (XI)

EXAMPLE 2

This example was carried out in the same manner as in EXAMPLE 1, except that 300 g (3.0 mol) of ethyl acrylate was used per 268 g (1.0 mol) of 1-(2-hydroxyethyl)-2-undecyl-2-imidazoline, and 120 g (3.0 mol) of sodium hydroxide was used. The reaction product contained a mixture containing the compound of structural formula IX: 21%, the compound of formula X: 19% and the compound of formula XI: 53%, as well as a small amount of an ether linkage-containing amphoteric compound and a small amount of an unreacted amidoamine.

EXAMPLE 3

This example was carried out in the same manner as in EXAMPLE 1, except that 150 g (1.5 mol) of ethyl acrylate was used per 260 g (1.0 mol) of 1-(2-hydroxyethyl)-2-undecyl-2-imidazoline and 60 g (1.5 mol) of sodium hydroxide was used. The reaction product contained a mixture containing the compound of structural formula IX: 60%, the compound of formula X: 4% and the compound of formula XI: 1%, 15% of an α-unsubstituted amidoamine type amphoteric compound and a small amount of an ether linkage-containing amphoteric compound and an unreacted amidoamine.

EXAMPLE 4

This example was carried out in the same manner as in EXAMPLE 1, except that 287 g (1 mol) of 1-(2-hydroxyethyl)-2-coconut alkyl-2-imidazoline synthesized from coconut acid (AV 256, average molecular weight 219) and aminoethylethanolamine was used. The reaction product contained a mixture containing the compound of structural formula VI: 64%, the compound of formula VII: 16% and the compound of formula VIII: 8%, as well as a small amount of an ether linkage-containing amphoteric compound and a small amount of an unreacted amidoamine.

EXAMPLE 5

This example was carried out in the same manner as in EXAMPLE 1, except that 356 g (1 mol) of 1-(2-hydroxyethyl)-2-imidazoline synthesized from stearic acid (AV 195, average molecular weight 288) and aminoethylethanolamine was used, and 1200 g of water was added at the time of saponification. The reaction product contained the compound of general formula VI: 65%, the compound of formula VII: 17% and the compound of formula VIII: 7%, as well as a small amount of an ether linkage-containing amphoteric compound and a small amount of an unreacted amidoamine.

EXAMPLE 6

This example was carried out in the same manner as in EXAMPLE 1, except that 348.5 g (1 mol) of an imidazoline synthesized from oleic acid (AV 200, average molecular weight 280.5) and aminoethylethanolamine, and 172 g (2.0 mol) of methyl acrylate were used, and 1200 g of water was added at the time of saponification. The reaction product contained a mixture containing the compound of general formula VI: 63%, the compound of formula VII: 15% and the compound of formula VIII: 9%, as well as a small amount of an ether linkage-containing amphoteric compound and a small amount of an unreacted amidoamine.

EXAMPLE 7

Two hundred and sixty-eight g (268 g, 1.0 mol) of 1-(2-hydroxyethyl)-2-undecyl-2-imidazoline was melten at 40°-50° C., to which was added 200 g (2.0 mol) of ethyl acrylate. The mixture was reacted at 60°-65° C. for 3 hr. An intermediate represented by the general formula I-2 was obtained. To this intermediate were added 36 g (2.0 mol) of water and 100 g (1.0 mol) of ethyl acrylate. The resulting mixture was stirred at 65°-70° C. for 3 hr. Further, to this reaction mixture was added an aqueous solution prepared by dissolving 120 g (3.0 mol) of sodium hydroxide into 996 g of water, and the reaction mixture was saponified at 65°-70° C. for 2 hr. A light yellow liquid was obtained. Analysis showed that the product contained a mixture containing the compound of structure IX: 34%, the compound of structure X: 18% and the compound of structure XI: 38%, as well as a small amount of an ether linkage-containing amphoteric compound and a small amount of an unreacted amidoamine.

COMPARATIVE EXAMPLE 1

To two hundred and sixty-eight g (268 g, 1.0 mol) of 1-(2-hydroxyethyl)-2-undecyl-2-imidazoline was added 54 g (3.0 mol) of water, and the mixture was stirred at 80°-85° C. for 2 hr. to open the imidazoline rings. Then, after adding 110 g (1.1 mol) of ethyl acrylate, the mixture was stirred at 65°-70° C. for 3 hr. To this reaction mixture was further added 775 g of an aqueous solution containing 44 g (1.1 mol) of sodium hydroxide, and the mixture was saponified at 65°-70° C. for 2 hr. A light-yellow liquid was obtained. Analysis showed that the hydrophobic group-containing component of the liquid did not contain a dibasic acid which could be obtained in case where an alkyl acrylate was added to an α position, but contained lauric acid only, and that the main product was a mixture of the following compounds II', III' and IV'.

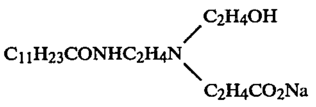
(II')

-continued

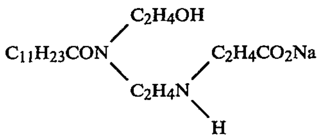
(III')

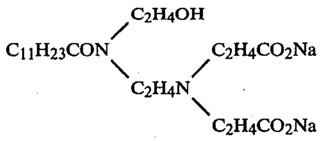
(IV')

COMPARATIVE EXAMPLE 2

Two hundred and sixty-eight g (260 g, 1.0 mol) of 1-(2-hydroxyethyl)-2-undecyl-2-imidazoline was mixed with 200 g (2.0 mol) of ethyl acrylate and 36 g (2.0 mol) of water at room temperature. The mixture was reacted at 70° C. for 2 hr. To this mixture was added an aqueous solution prepared by dissolving 80 g (2.0 mol) of sodium hydroxide into 996 g of water, and the mixture was saponified at 70° C. for 2 hr. A light-yellow liquid was obtained. Analysis showed that this liquid contained almost no compound having a carboxyethyl group in a position of the amido group, and that the main product was a mixture of the above structures III' and IV'.

What is claimed is:

1. An α-substituted carboxylamidoamine having the formula I:

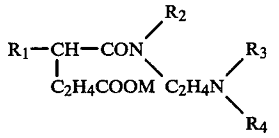
(I)

wherein $R_1$ is alkyl having 6 to 20 carbon atoms or alkenyl having 6 to 20 carbon atoms, $R_2$ is H or $C_2H_4OH$, $R_3$ and $R_4$ are H, $C_2H_4COOM$ or $C_2H_4OH$, with the provisos that (1) when $R_2$ is $C_2H_4OH$, $R_3$ and $R_4$ are H or $C_2H_4COOM$, and (2) when $R_2$ is H, one of $R_3$ and $R_4$ is $C_2H_4OH$, and M is H, alkali metal, ammonium or organic ammonium.

2. A process for preparing α-substituted carboxylamidoamines having the formula I:

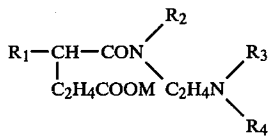
(I)

wherein $R_1$ is alkyl having 6 to 20 carbon atoms or alkenyl having 6 to 20 carbon atoms, $R_2$ is H or $C_2H_4OH$, $R_3$ and $R_4$ are H, $C_2H_4COOM$ or $C_2H_4OH$, with the provisos that (1) when $R_2$ is $C_2H_4OH$, $R_3$ and $R_4$ are H or $C_2H_4COOM$, and (2) when $R_2$ is H, one of $R_3$ and $R_4$ is $C_2H_4OH$, and M is H, alkali metal, ammonium or organic ammonium, which comprises: in a first reaction stage, reacting an imidazoline having the formula I-1:

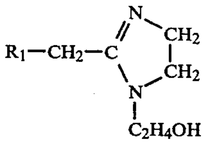

(I-1)

wherein $R_1$ is the same as defined above, with at least 1.0 mol, per mol of said imidazoline having the formula (I-1), of an alkyl acrylate having the formula $CH_2{=}CHCOOR_5$, wherein $R_5$ is alkyl having 1 to 4 carbon atoms, at a reaction temperature of 50° to 80° C., under substantially anhydrous conditions, to convert said imidazoline to an intermediate having the formula I-2:

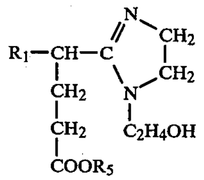

(I-2)

wherein $R_1$ and $R_5$ are the same as defined above; and then, in a second reaction stage, adding to said intermediate from 1.0 to 5.0 mols of water, per mol of said imidazoline having the formula (I-1), and reacting said intermediate with said water at a temperature of 40° to 90° C., to effect opening of the imidazoline ring, and saponifying the ester linkages derived from said alkyl acrylate with an aqueous alkali, the total amount of said alkyl acrylate added during the process being in the range of from 1.0 to 5.0 mols, per mol of said imidazoline having the formula (I-1).

3. A process as claimed in claim 2 in which the total amount of said alkyl acrylate added during the process is from 1.5 to 3.5 mols and the amount of water added in the second reaction stage is from 1.5 to 2.5 mols, both per mol of said imidazoline having the formula (I-1).

4. A process as claimed in claim 2 in which all of said alkyl acrylate is added in the first reaction stage.

5. A process as claimed in claim 2 in which a portion of said alkyl acrylate is added in the second reaction stage.

6. A process as claimed in claim 2 in which less than 0.3 wt. % of water is present during the first reaction stage.

7. The product prepared by the process of claim 2.

8. A composition consisting essentially of a mixture of α-substituted carboxylamidoamines having the formula I:

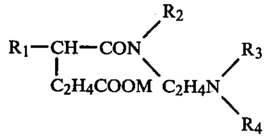

(I)

wherein $R_1$ is alkyl having 6 to 20 carbon atoms or alkenyl having 6 to 20 carbon atoms, $R_2$ is H or $C_2H_4OH$, $R_3$ and $R_4$ are H, $C_2H_4COOM$ or $C_2H_4OH$, with the provisos that (1) when $R_2$ is $C_2H_4OH$, $R_3$ and $R_4$ are H or $C_2H_4COOM$, and (2) when $R_2$ is H, one of $R_3$ and $R_4$ is $C_2H_4OH$, and M is H, alkali metal, ammonium or organic ammonium.

* * * * *